(12) United States Patent
Srinivasagopalan et al.

(10) Patent No.: US 12,069,085 B2
(45) Date of Patent: Aug. 20, 2024

(54) AUTOMATIC GENERATION OF TROJAN SIGNATURES FOR INTRUSION DETECTION

(71) Applicant: AT&T Intellectual Property I, L.P., Atlanta, GA (US)

(72) Inventors: Srivathsan Srinivasagopalan, Bee Cave, TX (US); Ganesh Subramaniam, Bridgewater, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 258 days.

(21) Appl. No.: 17/805,025

(22) Filed: Jun. 1, 2022

(65) Prior Publication Data
US 2023/0396645 A1 Dec. 7, 2023

(51) Int. Cl.
*H04L 9/40* (2022.01)

(52) U.S. Cl.
CPC ........ *H04L 63/145* (2013.01); *H04L 63/1416* (2013.01)

(58) Field of Classification Search
CPC .................. H04L 63/145; H04L 63/1416
USPC .......................................................... 726/23
See application file for complete search history.

(56) References Cited

U.S. PATENT DOCUMENTS

| 2005/0265331 A1* | 12/2005 | Stolfo | H04L 43/00 370/389 |
| 2011/0283361 A1* | 11/2011 | Perdisci | G06F 21/56 726/24 |

\* cited by examiner

*Primary Examiner* — Frantz B Jean (57) ABSTRACT

A method includes acquiring a plurality of hypertext transfer protocol (HTTP) session packets associated with activities of a plurality of known Trojans, wherein all of the Trojans are identified by a common signature identifier, extracting a plurality of request packets from the session packets, identifying a plurality of suspicious request packets within the plurality of request packets, grouping the plurality of suspicious request packets into a plurality of subsets, computing a centroid of one subset of the plurality of subsets, identifying a representative packet for the subset, wherein the representative packet is identified based on the centroid, and generating a signature for the one subset, based on the representative packet, wherein the signature is deployable by an intrusion detection system to detect an instance of a Trojan of the plurality of known Trojans.

20 Claims, 8 Drawing Sheets

```
"2822801": {
"category": "Malware",
"cluster_members": [
"4 d0b0bca7f57c8709d9e3669334e908bbdabd81d61237cd66c2f870eabf419c7",
"1fc932dd574b7f19401e7942cbe595544dd94d867a10fc3a9d9bc673019c9598",
"897 a9eb3ee25c6d61186a7853fe233a0e2cdf672fbb8fae4696c724a95a9d4d5",
"adfb3dd9317640f902a05779ddd52c20d1a5050d271a418a9f4685ae52d3d64f",
"4f62d217b22bca81f28ea74a55b31c9bc6193d2a2602a b3a7f69d4f1c12hbe7f",
"d558bfb58eb63751a785d7d7803896 37ab71a53c523ccebc30de0432da307d0f",
"250 a9b0a12a825ee20854e0ebac7ca11d42e7582a9f8a5cac6ebc22d6511299a",
"137 e7f5f6254d861e1757a330f981759b28ab107963021b2d82d0d563831e61d
",
"50430 bf9b10ec13e57e43965cad2331c36194aadb1620c0c83ad9764dedd3f10",
"a100325c07cc87fd93b97abfec8f145e0f44ae00731c7034d73f9a50b57d9693"
],
"cluster_name": "DiamondFox",
"original_rule": "alert http $HOME_NET any -> $EXTERNAL_NET any
(msg:\" ETPRO TROJAN DiamondFox HTTP POST CnC Checkin \";
flow: to_server, established, content:\" POST \"; http_method;
content:\"/gate.php\"; http_uri; fast_pattern: only; content:
\" Content - Type |3a 20| application/x-www -form - urlencoded \";
pcre:\"/^[a-f0-9]{3}+=[A-F0-9]{200,}$/P\"; pcre:\"/\\/gate
\\.php$/U\"; reference:md5, b856ee00318bbdbafcc48953504244 56;
classtype:trojan - activity; sid:2822801; rev:2; metadata:
affected_product Windows_XP_Vista_7_8_10_Server_32_64_Bit,
attack_target Client_Endpoint, deployment Perimeter,
signature_severity Major, created_at 2016_10_21, malware_
family DiamondFox, updated_at 2016_10_21;)",
"sid": 2822801,
"subcategory": "Trojan"
}
```

FIG. 3

{
e584305...9e1f9: {0: [1, 2, 6], 1: [3, 5], 2: [4], 3: [7]},
e86abd0...6e936: {0: [2], 1: [1, 3, 4]},
12addb5...1bf04: {0: [1, 6], 1: [2, 3, 4, 5]},
7af163a...6e9ff: {0: [1, 2, 3, 7], 1: [4, 6], 2: [5], 3: [8]},
9cf8dda...a589b: {0: [2, 3, 5], 1: [1, 4, 6], 2: [7], 3: [8]}
}

{
e584305...9e1f9: [[2], [3, 5], [4], [7]],
e86abd0...6e936: [[2], [3]],
12addb5...1bf04: [[1, 6], [4]],
7af163a...6e9ff: [[2], [4, 6], [5], [8]],
9cf8dda...a589b: [[5], [6], [7], [8]]
}

['Mozilla /4.0|20|( compatible |3B ||20| MSIE |20|6.0|3 B ||20| Windows |20|
NT |20|5.1|3 B ||20| SV1 |3B ||20|. NET4.0C|3B ||20|. NET4.0E)',
'Mozilla /4.0|20|( compatible |3B ||20| MSIE |20|6.0|3 B ||20| Windows |20|
NT |20|5.1|3 B ||20| SV1 |3B ||20|. NET4.0C|3B ||20|. NET4.0E)',
'Mozilla /4.0|20|( compatible |3B ||20| MSIE |20|6.0|3 B ||20| Windows |20|
NT |20|5.1|3 B ||20| SV1 |3B ||20|. NET4.0C|3B ||20|. NET4.0E)',
'vb |20||20| |20| wininet',
'vb |20||20| |20| wininet',
'vb |20||20| |20| wininet']

602

['Mozilla /4.0|20|( compatible |3B ||20| MSIE |20|6.0|3 B ||20| Windows |20|
NT |20|5.1|3 B ||20| SV1 |3B ||20|. NET4.0C|3B ||20|. NET4.0E)',
'vb |20||20| |20| wininet']

FIG. 6

Ground Truth 1 alert http $HOME_NET any -> $EXTERNAL_NET any (msg:" ET USER_AGENTS Suspicious User - Agent ( MSIE )"; flow : to_server , established ; content :" MSIE "; http_user_agent ; depth :4; threshold : type limit , count 2, track by_src , seconds 300; content :!" www . msftncsi .com "; http_host ; metadata : former_category TROJAN ; reference :url ,doc. emergingthreats .net/bin/ view / Main /2003657; classtype : trojan - activity ; sid :2003657; rev :18; metadata : affected_product Any , attack_target Client_Endpoint , deployment Perimeter , tag User_Agent, signature_severity Major , created_at 2010_07_30 , updated_at 2017_10_30 ;)

Generalized Signatures (auto-generated):

702 alert tcp $HOME_NET any -> $EXTERNAL_NET any (msg:" GENERIC TROJAN A Network Trojan was Detected "; flow : to_server, established ; content :" Connection |3A 20| Keep - Alive |0D 0A|"; http_header ; content :"/"; http_raw_uri ; content :" MSIE "; http_user_agent ; content :!" Referer |3A |"; nocase ; http_header ; content :" POST "; http_method ; classtype :trojan - activity ; sid :2003657; rev :1;)

704 alert tcp $HOME_NET any -> $EXTERNAL_NET any (msg:" GENERIC TROJAN A Network Trojan was Detected "; flow : to_server, established ; content :" Connection |3A 20| Keep - Alive |0D 0A|"; http_header ; content :".0"; http_user_agent ; content :!" Referer |3A|"; nocase ; http_header ; content :" GET "; http_method ; classtype :trojan - activity ; sid :2003657; rev :1;)

Ground Truth 2 alert http $HOME_NET any -> $EXTERNAL_NET any (msg:" ET USER_AGENTS Suspicious User-Agent (MYURL)"; flow:to_server, established; content:" User-Agent |3a| MYURL |0d 0a|"; http_header; threshold:type limit, count 2, track by_src, seconds 300; metadata:former_category TROJAN; reference:url, doc.emergingthreats.net/bin/view/Main/2006365; classtype:trojan-activity; sid:2006365; rev:10; metadata:affected_product Any, attack_target Client_Endpoint, deployment Perimeter, tag User_Agent, signature_severity Major, created_at 2010_07_30, updated_at 2017_10_30;)

800

Generalized Signatures (auto-generated)

alert tcp $HOME_NET any -> $EXTERNAL_NET any (msg:" GENERIC TROJAN A Network Trojan was Detected"; flow:to_server, established; content:" MYURL"; http_user_agent; content:!" Referer |3A|"; nocase; http_header; content:" GET"; http_method; classtype:trojan-activity; sid:2006365; rev:1;)

AUTOMATIC GENERATION OF TROJAN SIGNATURES FOR INTRUSION DETECTION

The present disclosure relates generally to network security, and relates more particularly to devices, non-transitory computer-readable media, and methods for automatically generating Trojan signatures for use by intrusion detection systems.

BACKGROUND

Cyber threats in the form of malicious software (also referred to as "malware") and other sophisticated mechanisms built by individuals, groups, and nation-state threat campaigns have increasingly targeted individual users and enterprise systems worldwide. These campaigns may be driven by different objectives (e.g., financial gain, political subversion, surveillance, espionage, etc.), but goals of the perpetrators are almost always two-fold: (1) to profit (monetarily or otherwise) from their campaigns; and (2) to remain undetected for as long as possible in order to maximize the profit (and preferably by expending a minimum amount of effort and executing in the most discrete manner).

SUMMARY

In one example, the present disclosure discloses a device, computer-readable medium, and method for automatically generating Trojan signatures for use by intrusion detection systems. For example, a method performed by a processing system including at least one processor may include acquiring a plurality of hypertext transfer protocol session packets associated with a plurality of known Trojans, wherein all Trojans in the plurality of known Trojans are identified by a common signature identifier, extracting a plurality of request packets from the plurality of hypertext transfer protocol session packets, identifying a plurality of suspicious request packets within the plurality of request packets that is extracted from the hypertext transfer protocol session packets, grouping the plurality of suspicious request packets into a plurality of subsets, computing a centroid of one subset of the plurality of subsets, identifying a representative packet for the one subset, wherein the representative packet is identified based on the centroid, and generating a signature for the one subset, based on the representative packet, wherein the signature is deployable by an intrusion detection system to detect an instance of a Trojan of the plurality of known Trojans.

In another example, a non-transitory computer-readable medium may store instructions which, when executed by a processing system including at least one processor, cause the processing system to perform operations. The operations may comprise acquiring a plurality of hypertext transfer protocol session packets associated with a plurality of known Trojans, wherein all Trojans in the plurality of known Trojans are identified by a common signature identifier, extracting a plurality of request packets from the plurality of hypertext transfer protocol session packets, identifying a plurality of suspicious request packets within the plurality of request packets that is extracted from the hypertext transfer protocol session packets, grouping the plurality of suspicious request packets into a plurality of subsets, computing a centroid of one subset of the plurality of subsets, identifying a representative packet for the one subset, wherein the representative packet is identified based on the centroid, and generating a signature for the one subset, based on the representative packet, wherein the signature is deployable by an intrusion detection system to detect an instance of a Trojan of the plurality of known Trojans.

In another example, a system may include a processing system including at least one processor and a non-transitory computer-readable medium storing instructions which, when executed by the processing system, cause the processing system to perform operations. The operations may comprise acquiring a plurality of hypertext transfer protocol session packets associated with a plurality of known Trojans, wherein all Trojans in the plurality of known Trojans are identified by a common signature identifier, extracting a plurality of request packets from the plurality of hypertext transfer protocol session packets, identifying a plurality of suspicious request packets within the plurality of request packets that is extracted from the hypertext transfer protocol session packets, grouping the plurality of suspicious request packets into a plurality of subsets, computing a centroid of one subset of the plurality of subsets, identifying a representative packet for the one subset, wherein the representative packet is identified based on the centroid, and generating a signature for the one subset, based on the representative packet, wherein the signature is deployable by an intrusion detection system to detect an instance of a Trojan of the plurality of known Trojans.

BRIEF DESCRIPTION OF THE DRAWINGS

The teachings of the present disclosure can be readily understood by considering the following detailed description in conjunction with the accompanying drawings, in which.

To facilitate understanding, similar reference numerals have been used, where possible, to designate elements that are common to the figures.

DETAILED DESCRIPTION

The present disclosure broadly discloses methods, computer-readable media, and devices for automatically generating Trojan signatures for use by intrusion detection systems. As discussed above, cyber threats in the form of malicious software code (also referred to as "malware") and other sophisticated mechanisms built by individuals, groups, and nation-state threat campaigns have increasingly targeted individual users and enterprise systems worldwide. These campaigns may be driven by different objectives (e.g., financial gain, political subversion, surveillance, espionage, etc.), but goals of the perpetrators are almost always twofold: (1) to profit (monetarily or otherwise) from their campaigns; and (2) to remain undetected for as long as possible in order to maximize the profit.

At present, approximately 400,000 new malware are being registered every day, which makes it a challenge for antivirus programs to process the large amounts of data obtained from malware analysis, and also makes it a challenge for antivirus developers to detect zero-day attacks and to develop and release updates to the antivirus programs in a reasonable timeframe to limit infection and propagation. Moreover, as the viciousness and variety of malware campaigns have continued to grow, the campaigns have also become increasingly difficult to combat. Malware campaigns may now include anything from ransomware worms to devastating wiper malware. The perpetrators of these campaigns are also becoming more adept at creating malware that can evade traditional countermeasures such as sandboxing. This provides a strong incentive for malware developers to modify and increase the complexity of their malicious code in order to decrease the chances of being detected by antivirus programs.

Currently, the predominant approach to malware detection comprises a signature-based approach in which a piece of code may be compared to signatures (i.e., sets of unique identifying attributes or patterns) for known malware; if the piece of code matches any of the signatures, the piece of code may be assumed to be an instance of the corresponding malware. Signature-based approaches tend to be adept at identifying instances of known malware with a very low rate of false positives. However, the signatures on which signature-based approaches rely are typically manually written by experienced malware researchers, who must identify particular pernicious malware, analyze the code of the malware, run the code of the malware in a sandbox, and then write and test a signature for the malware. This process is incredibly time consuming, not to mention that the first step (i.e., identifying a particularly pernicious malware early enough to minimize damage) is itself a non-trivial task. Often, a "hunt-and-pick" methodology is adopted to look for the worst malware. However, this methodology can be burdensome and inefficient.

Examples of the present disclosure provide a pipeline for automatically generating signatures for use in detecting Trojans (also referred to as "trojans"). Trojans comprise a specific subset of malware that download onto a host computing system disguised as legitimate or harmless software. For instance, a Trojan may be hidden in an email attachment or in an online file that is free to download. In one example, a signature that is automatically generated according to the present disclosure may be used to detect the presence of a specific Trojan as well as variants of the specific Trojan, while excluding detection of Trojans other than the specific Trojan and its variants. Moreover, a signature that is automatically generated according to the present disclosure may be used to detect the specific Trojan with low latency (e.g., may be capable of operating on a rate of approximately ten gigabytes per second, where this rate can be perceived as a minimum rate). This and other aspects of the present disclosure are discussed in greater detail with respect to FIGS. 1-9.

Figure 1:
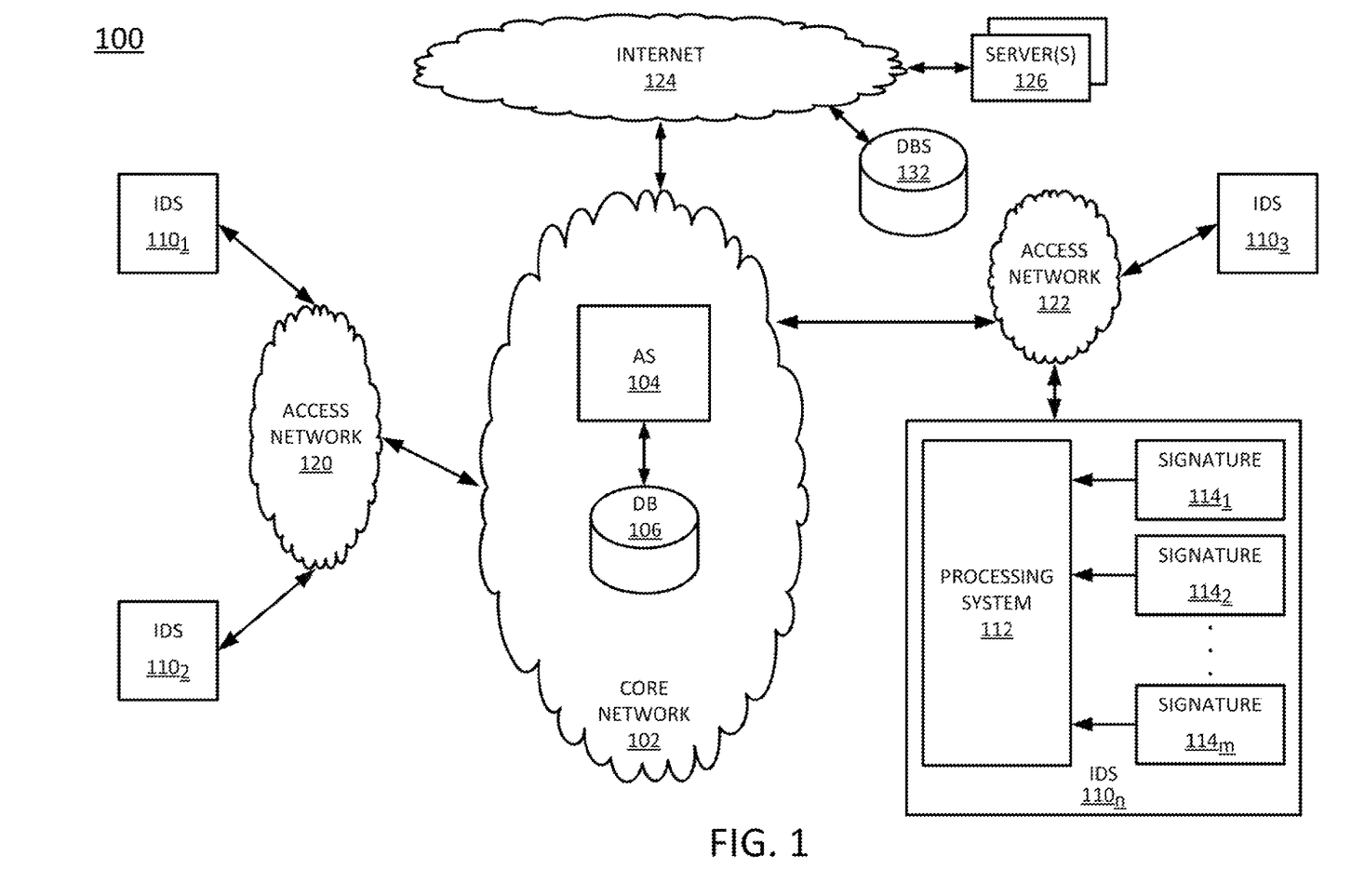
FIG. 1 illustrates an example system in which examples of the present disclosure for automatically generating Trojan signatures for use by intrusion detection systems may operate.

To further aid in understanding the present disclosure, FIG. 1 illustrates an example system 100 in which examples of the present disclosure for automatically generating Trojan signatures for use by intrusion detection systems may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wired network, a wireless network, and/or a cellular network (e.g., 2G-5G, a long term evolution (LTE) network, and the like) related to the current disclosure. It should be noted that an IP network is broadly defined as a network that uses Internet Protocol to exchange data packets. Additional example IP networks include Voice over IP (VoIP) networks, Service over IP (SoIP) networks, and the like.

In one example, the system 100 may comprise a core network 102. The core network 102 may be in communication with one or more access networks 120 and 122. In one example, the core network 102 may combine core network components of a wired or cellular network with components of a triple play service network; where triple-play services include telephone services, Internet services and television services to subscribers. For example, the core network 102 may functionally comprise a fixed mobile convergence (FMC) network, e.g., an IP Multimedia Subsystem (IMS) network. In addition, the core network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. The core network 102 may further comprise a broadcast television network, e.g., a traditional cable provider network or an Internet Protocol Television (IPTV) network, as well as an Internet Service Provider (ISP) network. In one example, the core network 102 may include a plurality of television (TV) servers (e.g., a broadcast server, a cable head-end), a plurality of content servers, an advertising server (AS), an interactive TV/video on demand (VoD) server, and so forth. As further illustrated in FIG. 1, the core network 102 may include an application server (AS) 104 and a database (DB) 106. For ease of illustration, various additional elements of network 102 are omitted from FIG. 1.

In one example, the access networks 120 and 122 may comprise Digital Subscriber Line (DSL) networks, public switched telephone network (PSTN) access networks, broadband cable access networks, Local Area Networks (LANs), wireless access networks (e.g., an IEEE 802.11/Wi-Fi network and the like), cellular access networks, $3^{rd}$ party networks, and the like. For example, the operator of core network 102 may provide telecommunication services to subscribers via access networks 120 and 122. In one example, the access networks 120 and 122 may comprise different types of access networks, may comprise the same type of access network, or some access networks may be the same type of access network and other may be different types of access networks. In one example, the core network 102 may be operated by a telecommunication network service provider. The core network 102 and the access networks 120 and 122 may be operated by different service providers, the same service provider or a combination thereof, or the access networks 120 and/or 122 may be operated by entities having core businesses that are not related to telecommunications services, e.g., corporate, governmental, or educational institution LANs, and the like.

In one example, the access networks 120 and 122 may be in communication with one or more intrusion detection systems (IDSs) $110_1$-$110_n$ (hereinafter individually referred to as an "IDS 110" or collectively referred to as "IDSs 110"). The access networks 120 and 122 may transmit and receive communications between the IDSs 110, the server(s) 126, the AS 104, other components of the core network 102, devices reachable via the Internet in general, and so forth. In one example, each IDS 110 may comprise any single device or combination of devices that may comprise an intrusion detection system, such as computing system 900 depicted in FIG. 9, and may be configured as described below. Each IDS 110 may be deployed within a different enterprise (e.g., a commercial business, a university, a government agency, or the like) and may be configured to detect the presence of malware in data packets (e.g., more broadly, network traffic) coming into and going out of the enterprise's network. Each IDS 110 may be further configured to take action on detected malware, such as generating an alert for review by a human administrator, logging the malware, sandboxing the malware, and/or other actions. In one example, at least one IDS 110 of the IDSs 110 is an open source intrusion detection system, such as the SUIRCATA open source intrusion detection system. Access networks 120 and 122 may transmit and receive communications between the IDSs 110 and the AS 104, as discussed in further detail below.

Referring to the details of IDS 110n as an example, each IDS 110 may include at least a processing system 112 and a plurality of signatures $114_1$-$114_m$ (hereinafter also referred to individually as a "signature 114" or referred to collectively as "signatures 114"). Each signature 114 may comprise a rule that, when run by the processing system 112, allows the processing system 112 to detect the presence of a known malware (and, optionally, variants of the known malware) in session packets coming into or going out of the network of the enterprise with which the IDS 110 is deployed. Each rule may further specify one or more actions to be taken when the associated malware is detected, such as generating an alert for a human administrator, logging the malware, sandboxing the malware, and/or other actions. Each signature 114 may be written to detect a different malware and its variants. Ideally each signature 114 should detect only the malware (and variants of the malware) for which the each signature 114 is written, and should not detect (and consequently act on) any other malware or any benign (e.g., non-malware) session packets. In one example, at least some of the signatures 114 are written specifically to detect Trojans and variants of those Trojans.

In one example, one or more servers 126 and one or more databases (DBs) 132 may be accessible to IDSs 110 via Internet 124 in general. The server(s) 126 and DBs 132 may operate in a manner similar to the AS 104 and DB 106, as described in further detail below.

Figure 9:
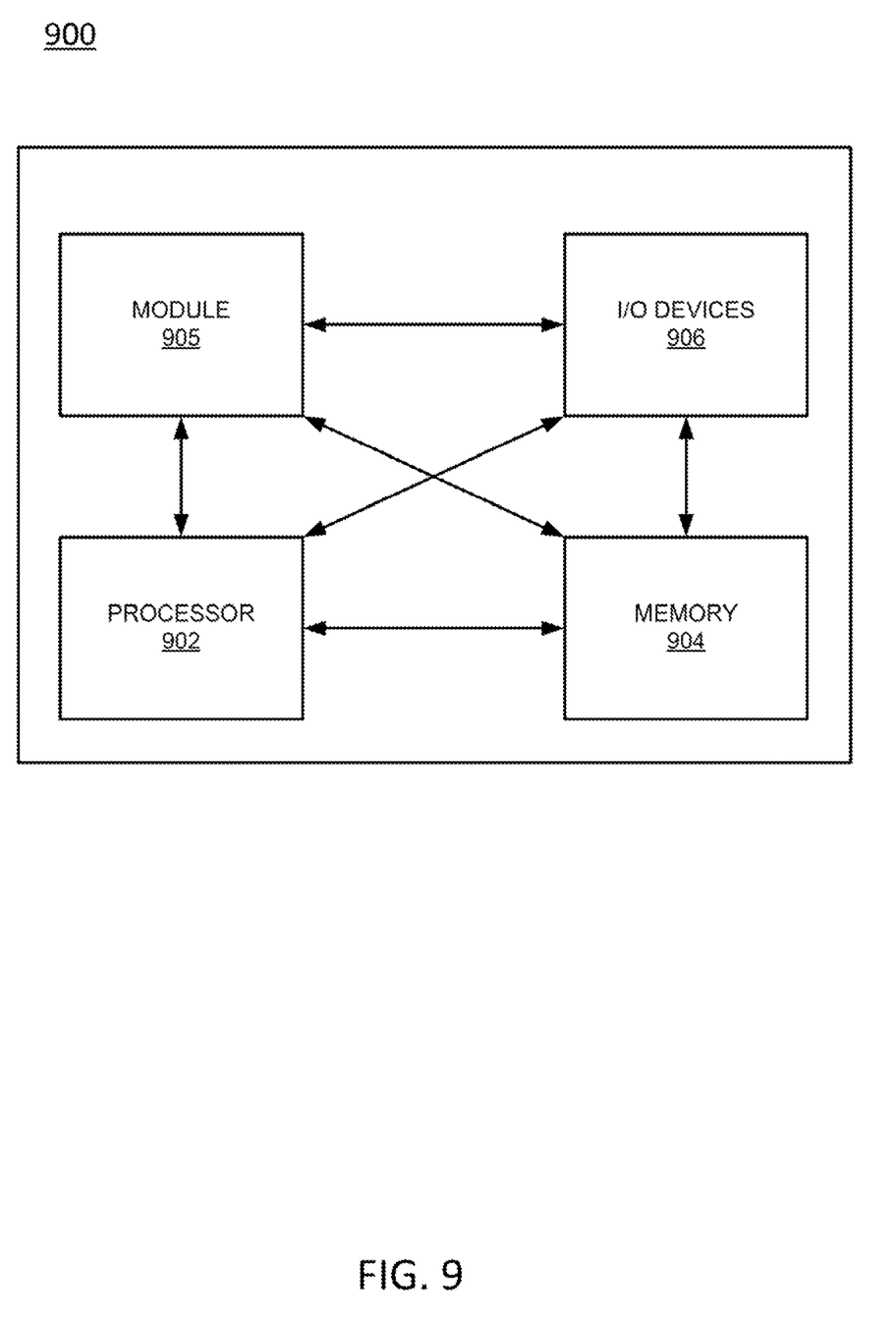
FIG. 9 illustrates an example of a computing device, or computing system, specifically programmed to perform the steps, functions, blocks, and/or operations described herein.

In accordance with the present disclosure, the AS 104 may be configured to provide one or more operations or functions in connection with examples of the present disclosure for automatically generating Trojan signatures for use by intrusion detection systems, as described herein. The AS 104 may comprise one or more physical devices, e.g., one or more computing systems or servers, such as computing system 900 depicted in FIG. 9, and may be configured as described below. It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 9 and discussed below) or multiple computing devices collectively configured to perform various steps, functions, and/or operations in accordance with the present disclosure.

In one example, the AS 104 may be configured to acquire hypertext transfer protocol (HTTP) session packets (broadly application layer session packets or simply session packets) associated with the activities of a plurality of known Trojans, wherein all Trojans in the plurality of known Trojans are identified by a common signature identifier (SID). The AS 104 may be further configured to extract request ("REQ") packets from the HTTP session packets and to identify those of the request packets that are deemed to be suspicious. In one example, any request packets that are not associated with an Internet Protocol (IP) address or domain on a given whitelist are assumed to be candidates for suspicious packets (e.g., assumed to be potentially suspicious).

Once the AS 104 has identified suspicious request packets, the AS 104 may be further configured to group the suspicious request packets into subsets based on similarities in the HTTP, transfer control protocol (TCP), and/or IP attributes of the suspicious request packets. The AS 104 may be further configured to select a representative packet for each subset of suspicious request packets and to generate a signature for a Trojan implicated by the representative packet. By generalizing the representative packet prior to generating the signature, the AS 104 may be able to ensure that the signature that is generated is generic enough to cause an IDS 110 to alert on not just the Trojan that is implicated by the representative packet, but on variants of the Trojan that is implicated by the respective packet as well (e.g., Trojans implicated by other suspicious packets within the subset to which the representative packet belongs).

The AS 104 may store these generated signatures and/or push the signatures to the IDSs 110 for use in analyzing incoming and outgoing session packets.

The DB 106 may store the SIDs for the plurality of known Trojans, as well as the HTTP session packets associated with the activities of the plurality of known Trojans. The AS 104 may retrieve the SIDs and the HTTP session packets from the DB 106 before generating a signature for one or more of the know Trojans. Additionally, the DB 106 may store the signatures that are generated by the AS 104. For instance, although the AS 104 may push the generated signatures to the IDSs 110, the AS 104 may also store copies of the signatures for later study and analysis, for updating, and/or for provision to new IDSs that may not yet have access to the signatures.

In one example, the DB 106 may comprise a physical storage device integrated with the AS 104 (e.g., a database server or a file server), or attached or coupled to the AS 104, in accordance with the present disclosure. In one example, the AS 104 may load instructions into a memory, or one or more distributed memory units, and execute the instructions for automatically generating Trojan signatures for use by intrusion detection systems as described herein. One example method for automatically generating Trojan signatures for use by intrusion detection systems is described in greater detail below in connection with FIG. 2

It should be noted that the system 100 has been simplified. Thus, those skilled in the art will realize that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements.

For example, the system 100 may include other network elements (not shown) such as border elements, routers, switches, policy servers, security devices, gateways, a content distribution network (CDN) and the like. For example, portions of the core network 102, access networks 120 and 122, and/or Internet 124 may comprise a content distribution network (CDN) having ingest servers, edge servers, and the like. Similarly, although only two access networks, 120 and 122 are shown, in other examples, access networks 120 and/or 122 may each comprise a plurality of different access networks that may interface with the core network 102 independently or in a chained manner. For example, IDSs 110 may communicate with the core network 102 via different access networks, and so forth. Thus, these and other modifications are all contemplated within the scope of the present disclosure.

Figure 2:
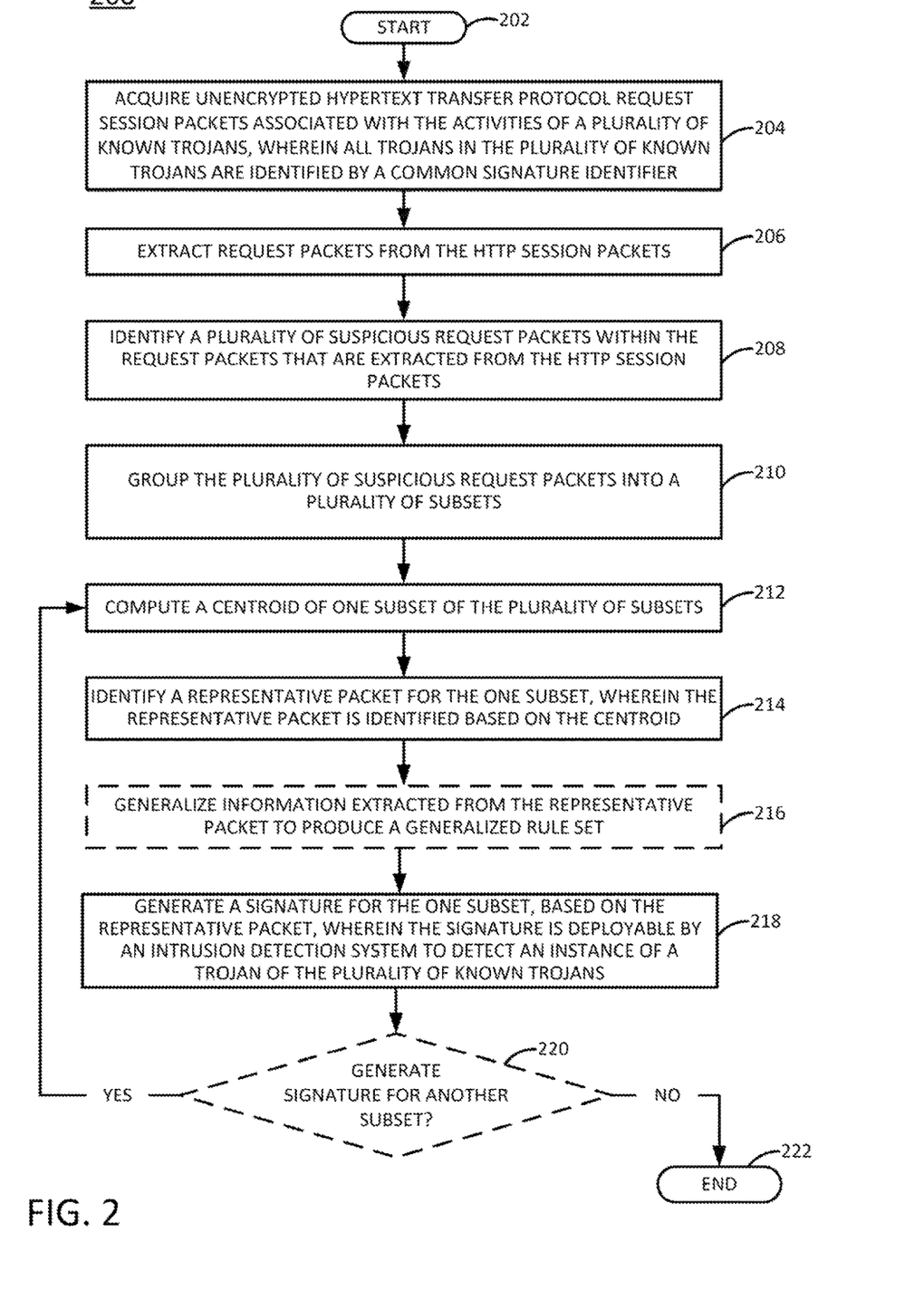
FIG. 2 illustrates a flowchart of an example method for automatically generating Trojan signatures for use by intrusion detection systems, in accordance with the present disclosure.

FIG. 2 illustrates a flowchart of an example method 200 for automatically generating Trojan signatures for use by intrusion detection systems, in accordance with the present disclosure. In one example, steps, functions and/or operations of the method 200 may be performed by a device as illustrated in FIG. 1, e.g., an application server 104 or any one or more components thereof. In one example, the steps, functions, or operations of method 200 may be performed by a computing device or system 900, and/or a processing system 902 as described in connection with FIG. 9 below. For instance, the computing device 900 may represent at least a portion of application server 104 in accordance with the present disclosure. For illustrative purposes, the method 200 is described in greater detail below in connection with an example performed by a processing system, such as processing system 902. The method 200 begins in step 202 and proceeds to step 204.

At step 204, the processing system may acquire unencrypted hypertext transfer protocol (HTTP) session packets associated with the activities of a plurality of known Trojans, wherein all Trojans in the plurality of known Trojans are identified by a common signature identifier.

Within the context of the present disclosure, a "signature identifier" (or SID) for a Trojan is understood to refer to a unique identification number that identifies a set of rules that may be loaded into an intrusion detection system in order to allow the intrusion detection system to detect the Trojan (and its variants). More specifically, the SID may identify a cluster of hashes, where each hash in the cluster of hashes represents a specific variant of the Trojan that is uniquely identified by the SID.

In one example, a set of application programming interfaces (APIs) for capturing network traffic for each Trojan variant may also be included in the SID. There are some APIs and automated scripts that will go to different systems (e.g., routers, servers, and other network elements) to capture the network traffic and accumulate the captured network traffic in one place (e.g., a server or a large database). The network traffic collected by these APIs and automated scripts may also be referred to herein as 'pcaps' (packet capture).

Figure 3:
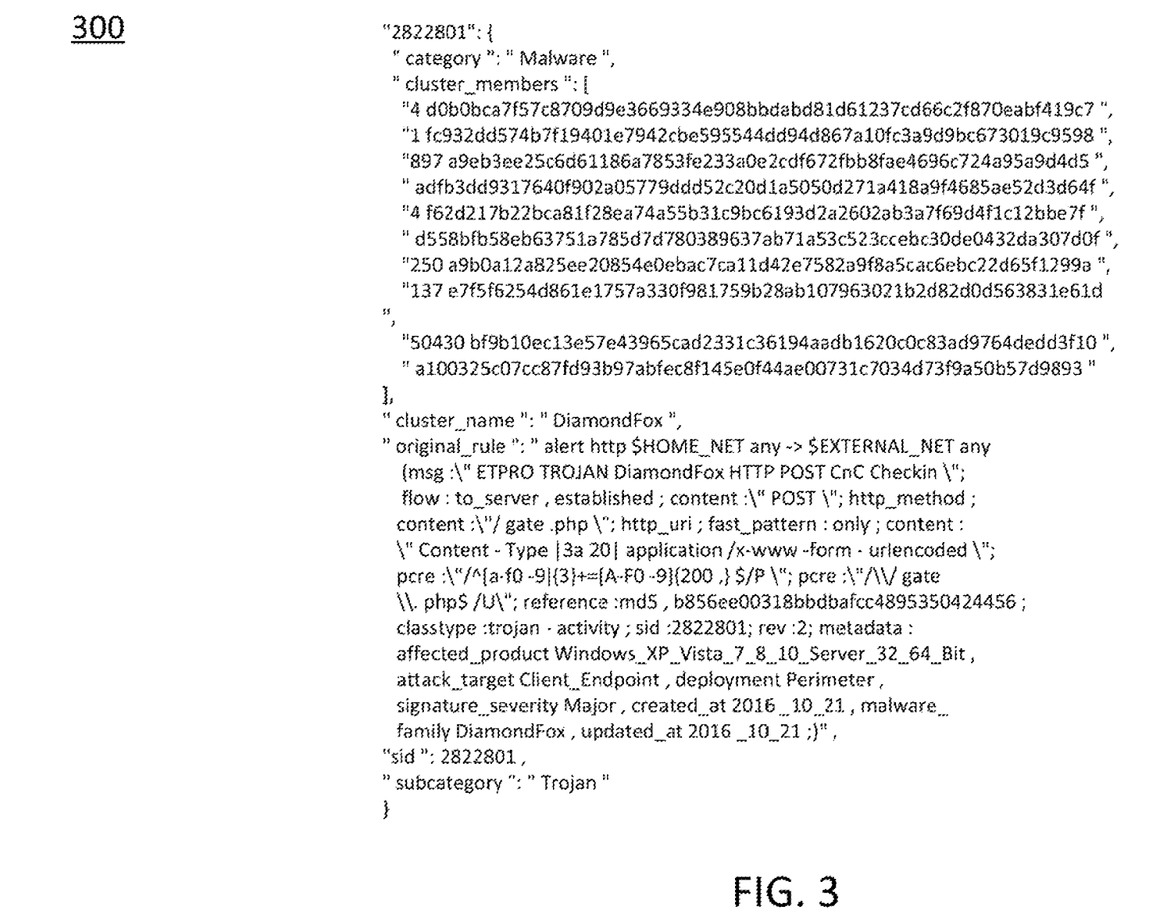
FIG. 3 illustrates an example cluster of hashes for the example signature identifier 2822801.

FIG. 3, for instance, illustrates an example cluster 300 of hashes for the example SID 2822801. In this case, the SID 2822801 has the ability to detect and alert on all of the hashes (Trojans/pcaps) listed in "cluster_members." The hashes listed in "cluster_members" may all be variants of a common Trojan.

In one example, the pcaps may be downloaded by the processing system from an internal repository when given a message-digest algorithm (MD5) hash.

In step 206, the processing system may extract request ("REQ") packets from the HTTP session packets. The request messages may comprise messages sent from one endpoint to another, in which the sending endpoint requests that the receiving endpoint take some specified action. In one example, the processing system may identify the REQ packets by scanning the header of an HTTP session packet for a request to be implemented. For instance, the start line (or other portions) of a packet header may include an HTTP method describing an action that is requested, such as GET, PUT, POST, or the like. Similarly, a packet header may include a specific request header, such as User-Agent, Accept, Accept-Language, Referer, If-None, or the like. If the header of a session packet contains a request to be implemented, then the session packet may be assumed to be a REQ packet. Conversely, if the header of a session packet does not contain a request to be implemented (or, alternatively, contains a status of a request to be implemented, such as successful or failed), then the session packet may be assumed to be a type of packet other than a REQ packet (such as a response packet). It has been experimentally observed that most useful Trojan signatures are derived from REQ packets including GET and POST methods.

In another example, the processing system may identify the REQ packets by scanning other portions of the session packets, such as the payload, for fetching important information contained in the request packets. Not all session packets will necessarily include payloads. Moreover, the processing system may not be able to view the payloads of all session packets due to encryption. However, if included and not encrypted, the payload of a session packet may include data associated with a request (e.g., contents of a hypertext markup language (HTML) form associated with a POST request, or the like).

In step 208, the processing system may identify a plurality of suspicious request packets within the request packets that are extracted from the HTTP session packets. In one example, suspicious packets may be identified through a process of elimination. For instance, the processing system may acquire a whitelist specifying Internet Protocol (IP) addresses and domains associated with known legitimate (or not suspicious) session packets. The whitelist could be relatively large (e.g., between ten thousand and one million IP addresses and/or domains). In this case, the whitelist may be used to filter the extracted request packets: any of the request packets having IP addresses or domains (or other identifying information) that matches information on the whitelist may be ruled out as not suspicious. In one example, any of the request packets that remain after the whitelist has been used to filter are considered to be candidates for suspicious request packets (e.g., potentially suspicious).

In step 210, the processing system may group the plurality of suspicious request packets into a plurality of subsets. In one example, the plurality of suspicious request packets are grouped into the plurality of subsets based on similarity (e.g., such that all suspicious request packets belonging to a common subset share some common attribute).

In a further example, all packets of the plurality of suspicious packets may be confirmed to be in JavaScript Object Notation (JSON) format prior to being grouped into the plurality of subsets. Thus, the plurality of suspicious request packets may be viewed by the processing system as JSON documents. Clustering of JSON documents may be performed in any one or more of a variety of known ways (e.g., affinity propagation, spectral clustering or other clustering techniques).

In one example, grouping in accordance with step 210 examines the HTTP, IP, and transmission control protocol (TCP) sections of the suspicious request packets and groups the suspicious request packets based on the presence of similar attributes in the HTTP, IP, and TCP sections. For instance, when examining the HTTP sections, packets sharing one or more of the following attributes may be grouped into a common subset: uniform resource identifier (uri), method or action requested (method), intended recipient of the suspicious request packet (host), acceptable media types for response (accept), acceptable content encoding or compression algorithms for response (accept-encoding), sender's user agent string (user-agent), version, length of packet payload in octets (content length), media type of the packet payload (content-type), type of encoding used on the packet payload (content-encoding), control options for the current connection and list of hop-by-hop request fields (connection), the address of a previous web page from which a link to a currently requested web page was followed (referer), and/or other attributes.

When examining the TCP and IP sections, packets sharing one or more of the following attributes may be grouped into a common subset: source address (src_addr), destination address (dst_addr), packet length in bytes (len), time to live (ttl), protocol, source port (src_prt), destination port (dst_prt), and/or other attributes.

Once a suspicious packet is parsed for some combination of HTTP, TCP, and IP attributes (e.g., any combination of the attributes discussed above), a vector may be generated from the values of the parsed attributes. The vectors for all packets of the plurality of suspicious packets may then be placed in an initial matrix. Then, a similarity matrix may be generated from the initial matrix (e.g., using term frequency-inverse document frequency (TF-IDF) and the $l^2$-norm). Once the similarity matrix is generated, a clustering technique such as spectral clustering may be used to generate mini-clusters of the suspicious packets.

Figure 4:
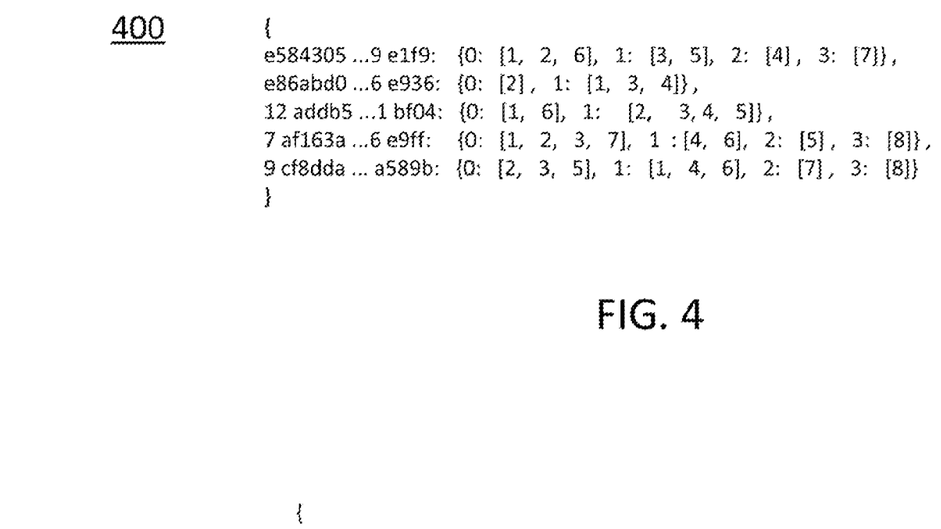
FIG. 4 illustrates an example set of mini-clusters that may be generated from an example similarity matrix.

FIG. 4, for instance, illustrates an example set 400 of mini-clusters that may be generated from an example similarity matrix. In one example, each entry in the set 400 has a hash value (compressed in FIG. 4 for ease of illustration) followed by a dictionary of mini-cluster number and the subset of the suspicious packets that forms the mini-cluster. For example, for the hash e584305 . . . c9e1f9, packets 1, 2, and 6 form a mini-cluster with a label of 0.

Referring back to FIG. 2, in step 212, the processing system may compute a centroid of one subset of the plurality of subsets. In one example, the centroid of the one subset comprises a representative element of the one subset. In one example, the centroid is computed in such a way that a real packet/data-object is chosen rather than a hypothetical central value vector.

Figure 5:
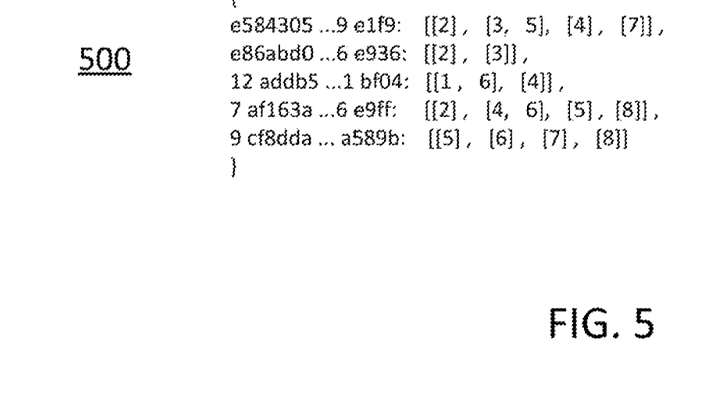
FIG. 5 illustrates an example centroid that has been computed for an example mini-cluster of the example mini-clusters illustrated in FIG. 4.

In one example, the centroid for a mini-cluster may be computed as shown in FIG. 5, which illustrates a centroid 500 that has been computed for an example mini-cluster of the example mini-clusters illustrated in FIG. 4. The centroids that are computed by this approach comprise the suspicious packets to be analyzed further.

In step 214, the processing system may identify a representative packet for the one subset, wherein the representative packet is identified based on the centroid. For instance, in one example, the representative packet may comprise the suspicious request packet within the one subset that is closest to the centroid. Referring back to the example of FIG. 5, for the hash e584305 . . . c9e1f9, packets 2, 4, and 7 may comprise GET requests, while packets 3 and 5 may comprise POST requests. Since each request type is represented by more than one packet instance, each request type can be reduced to a single representative packet of each request type (e.g., one GET request, one POST request, etc.). In one example, commonalities and distinctiveness that are identified among the suspicious packets of a common request type may be considered, and a final set of one or more representative packets (e.g., one representative packet for each request type represented in the subset or mini-cluster) may be generated.

In optional step 216 (illustrated in phantom), the processing system may generalize information extracted from the representative packet to produce a generalized rule set. Generalization of the information extracted from the representative packet ensures that a signature that is ultimately generated by the processing system based on the representative packet will be generic enough to capture variants of the Trojan(s) associated with the representative packet. In one example, where a plurality of representative packets is identified in step 214 (e.g., one representative packet for each request type represented in the subset or mini-cluster), information extracted from each of the representative packets may be generalized.

In step 218, the processing system may generate a signature for the one subset, based on the representative packet (or on generalized information extracted from the representative packet in accordance with step 216), wherein the signature is deployable by an intrusion detection system to detect an instance of a Trojan of the plurality of known Trojans (i.e., instances of Trojans associated with the suspicious request packets that are members of the one subset). In one example, signatures may be generated for all suspicious request packets identified in step 208, both before and after generalization of extracted information. A signature that is generated for a pre-generalization suspicious request packet may prove useful for later study and analysis. Moreover, in one embodiment it should be noted that the signature may be considered "deployable" only after the signature has undergone rigorous tuning, relaxation, and testing post-generation.

In one example, signature generation involves first parsing out, for each suspicious request packet in the one subset to which the representative packet belongs, the HTTP, TCP, and IP sections in parallel and extracting the attributes (e.g., described above) from the HTTP, TCP, and IP sections. Then, the processing system may identify common substrings from each section and/or attribute of the one subset. For instance, the HTTP sections of the suspicious request packets may include a user-agent (UA) attribute. In this case, the UA attributes for all of the suspicious request packets may be extracted, and the longest common subsequence (LCS) among the UA attributes may be determined. In one example, the LCS may be determined using approximations and generalized suffix trees.

Figure 6:
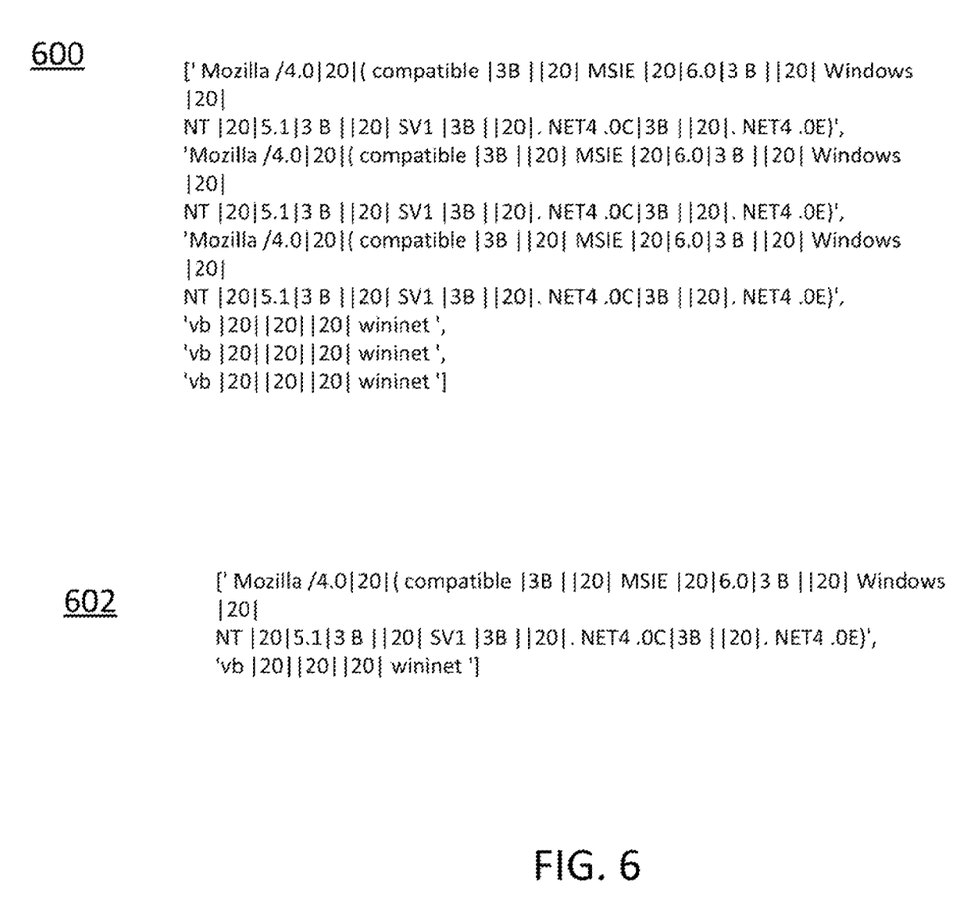
FIG. 6 illustrates an example set of values for a user-agent attribute within an example subset of suspicious request packets.

FIG. 6, for instance, illustrates an example set of values 600 for a user-agent attribute within an example subset of suspicious request packets. The resulting, compacted set of UA values 602 is depicted as against 11201.

In one example, cases like "=," "&/," "&/=," and others may be carefully avoided by heuristics. All of the information strings may then be assembled together according to the syntax of the intrusion detection system for which the signature is being generated for deployment, and further relaxed to make the signature generic.

Figure 7:
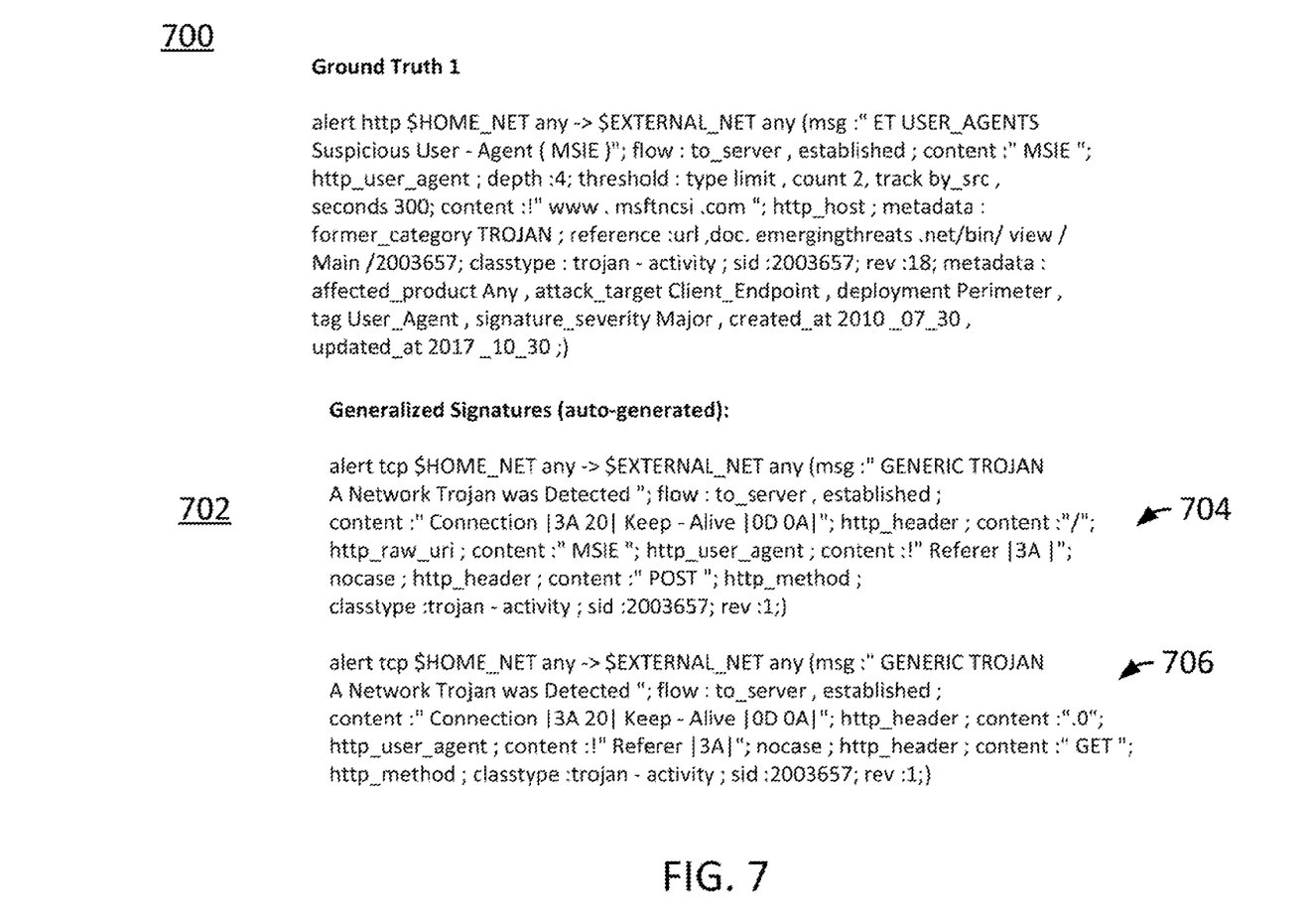
FIG. 7 illustrates an example set of generalized signatures and an associated ground truth for the example set of values illustrated in FIG. 6.

FIG. 7, for instance, illustrates an example set of generalized signatures 702 and an associated ground truth 700 for the example set of values 600 illustrated in FIG. 6. In the example illustrated in FIG. 7, two signatures 702 are generated: a first signature 704 for a POST request and a second signature 706 for a GET request. By comparing the two signatures 704 and 706, it appears that the first signature 704 is a better match to the ground truth 700, due to the common presence of "MSIE" in the content field.

Figure 8:
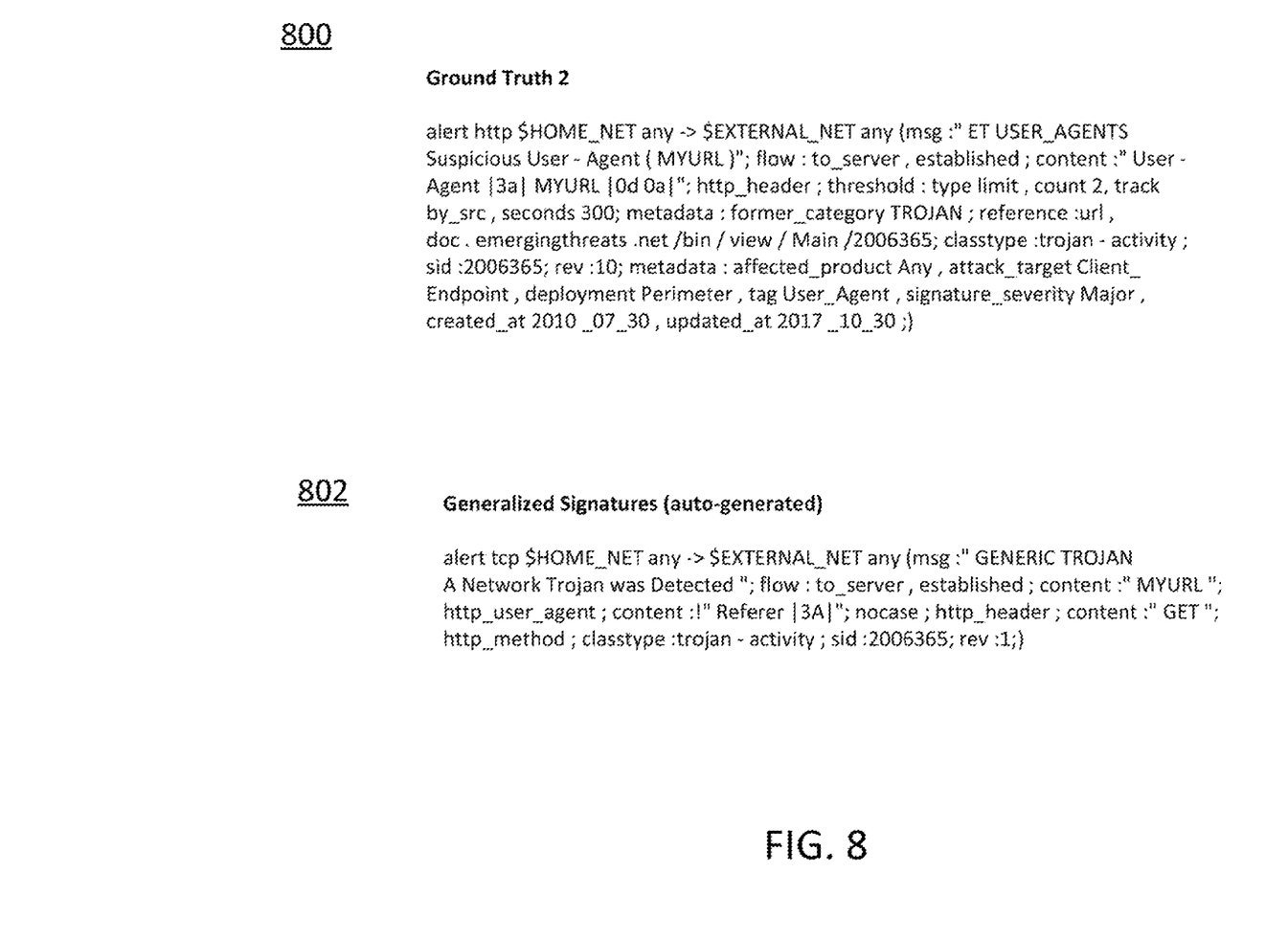
FIG. 8 illustrates an example set of generalized signatures and an associated ground truth for the example set of signatures illustrated in FIG. 6.

FIG. 8 illustrates an example set of generalized signatures 802 and an associated ground truth 800 for the example set of signatures 600 illustrated in FIG. 6. In the example illustrated in FIG. 8, "MYURL" is common among the signature 802 and the ground truth 800.

In one example, the example signatures 704, 706, and 802 are written to be run on the SURICATA open source intrusion detection system. However, the SURICATA intrusion detection system is discussed herein as an example only. In other examples, the signatures generated herein could be written to be run on other intrusions detection systems, including the SNORT open source intrusion detection system and other systems.

The SURICATA intrusion detection system is typically run on specialized hardware and is used to detect known malware in incoming and outgoing session packets using a large list of signatures. The SURICATA intrusion detection system may be deployed within an enterprise to intercept and examine all incoming and outgoing session packets.

A SURICATA signature typically includes two portions: (1) a signature header; and (2) the signature options. The signature header may look as follows:

<alert> <protocol> <src IP> <src port> <direction> <dst IP> <dst port>

The signature options contain the rest of the signature. The signature options may include a series of key-value pairs that, when matched by an incoming or outgoing session packet, would trigger an alert. In one example, the content portions of the signature options should match in incoming Trojan parsed out from a TCP stream and generate an alert (and optionally perform other operations, such as logging).

The syntax of the SURICATA intrusion detection system includes a plurality of important, broad sections, some of which are noted above and include: action, protocol, source/destination, ports, direction, and rule-options. The crux of the signature that is generated by the processing system lies in the action, protocol, source/destination, ports, direction, and contents sections of the syntax. Meta options such as msg, flow, reference, classtype, sid, and rev are mainly informational and in one example do not contribute to the triggering logic. The contents section includes a series of predicates that needs to be matched by any incoming session packet for the intrusion detection system to trigger an alert.

In one example, the resulting signature that is generated in step 218, should satisfy a set of at least three ground truths or conditions. These ground truths are: (1) the signature should trigger an alert for the Trojan for which the signature is written; (2) the signature should be generic enough to trigger an alert for all Trojans which are similar, but not identical, to the Trojan for which the signature is written; and (3) the signature should not trigger an alert for any family of Trojans for which the signature is not written or on any benign session packets (i.e., session packets not containing any Trojans). In addition, the resulting signature should be able to perform with low latency (e.g., on 10 Gigabytes per second).

In optional step 220 (illustrated in phantom), the processing system may determine whether a signature for another subset of the plurality of subsets should be generated.

If the processing system concludes in step 220 that a signature for another subset of the plurality of subsets should be generated, then the method 200 may return to step 212, and the processing system may repeat steps 212-218 in the manner described above for the another subset. If, however, the processing system concludes in step 220 that a signature for another subset of the plurality of subsets should not be generated, then the method 200 may end in step 222.

Thus, given a set of known Trojans, the method 200 is able to automatically identify a set of suspicious packets and to zero in on the attributes of the packets that are most closely associated with the known Trojans. This allows the method 200 to automatically derive a signature for a known Trojan and its variants in a quick and efficient manner, minimizing the time for deployment of the signature in an intrusion detection system (and thereby limiting the amount of damage that the known Trojan is capable of perpetrating). The approach disclosed herein is capable of generating signatures that perform quickly and reliably in far less time than it would take a human malware researcher to develop the same signature. Moreover, although examples of the present disclosure focus on the generation of the signatures for the detection of Trojans, in some examples the concepts disclosed herein may be modified and/or extended to generate signatures for the detection of other types of malware.

It should be noted that the method 200 may be expanded to include additional steps or may be modified to include additional operations with respect to the steps outlined above. In addition, although not specifically specified, one or more steps, functions, or operations of the method 200 may include a storing, displaying, and/or outputting step as required for a particular application. In other words, any data, records, fields, and/or intermediate results discussed in the method can be stored, displayed, and/or outputted either on the device executing the method or to another device, as required for a particular application. Furthermore, steps, blocks, functions or operations in FIG. 2 that recite a determining operation or involve a decision do not necessarily require that both branches of the determining operation be practiced. In other words, one of the branches of the determining operations can be deemed as an optional step. Furthermore, steps, blocks, functions or operations of the above described method can be combined, separated, and/or performed in a different order from that described above, without departing from the examples of the present disclosure.

FIG. 9 depicts a high-level block diagram of a computing device or processing system specifically programmed to perform the functions described herein. As depicted in FIG. 9, the processing system 900 comprises one or more hardware processor elements 902 (e.g., a central processing unit (CPU), a microprocessor, or a multi-core processor), a memory 904 (e.g., random access memory (RAM) and/or read only memory (ROM)), a module 905 for automatically generating Trojan signatures for use by intrusion detection systems, and various input/output devices 906 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 200 as discussed above is implemented in a distributed or parallel manner for a particular illustrative example, i.e., the steps of the above method 200, or the entire method 200 is implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 902 can also be configured or programmed to cause other devices to perform one or more operations as discussed above. In other words, the hardware processor 902 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 200. In one example, instructions and data for the present module or process 905 for automatically generating Trojan signatures for use by intrusion detection systems (e.g., a software program comprising computer-executable instructions) can be loaded into memory 904 and executed by hardware processor element 902 to implement the steps, functions, or operations as discussed above in connection with the illustrative method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 905 for automatically generating Trojan signatures for use by intrusion detection systems (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method comprising:
  acquiring, by a processing system including at least one processor, a plurality of hypertext transfer protocol session packets associated with a plurality of known trojans, wherein all trojans in the plurality of known trojans are identified by a common signature identifier;
  extracting, by the processing system, a plurality of request packets from the plurality of hypertext transfer protocol session packets;
  identifying, by the processing system, a plurality of suspicious request packets within the plurality of request packets that is extracted from the hypertext transfer protocol session packets;
  grouping, by the processing system, the plurality of suspicious request packets into a plurality of subsets;
  computing, by the processing system, a centroid of one subset of the plurality of subsets;
  identifying, by the processing system, a representative packet for the one subset, wherein the representative packet is identified based on the centroid; and
  generating, by the processing system, a signature for the one subset, based on the representative packet, wherein the signature is deployable by an intrusion detection system to detect an instance of a trojan of the plurality of known trojans.

2. The method of claim 1, wherein the common signature identifier identifies a cluster of hashes, where each hash in the cluster of hashes represents a specific variant of a trojan that is uniquely identified by the common signature identifier.

3. The method of claim 1, wherein each request message in the plurality of request messages comprises a request message sent from a sending endpoint device to a receiving endpoint device, in which the sending endpoint device requests that the receiving endpoint device take a specified action.

4. The method of claim 1, wherein the extracting comprises scanning headers of the hypertext transfer protocol session packets for a request to be implemented.

5. The method of claim 4, wherein the request to be implemented comprises at least one of: get, put, post, user-agent, accept, accept-language, referer, or if-none.

6. The method of claim 1, wherein the extracting comprises scanning payloads of the hypertext transfer protocol session packets for data associated with a request.

7. The method of claim 6, wherein the data includes contents of a hypertext markup language form associated with a post request.

8. The method of claim 1, wherein the plurality of suspicious request packets comprises request packets of the plurality of request packets which specify internet protocol addresses that do not appear on a whitelist acquired by the processing system.

9. The method of claim 1, wherein the plurality of suspicious request packets comprises request packets of the plurality of request packets which specify domains that do not appear on a whitelist acquired by the processing system.

10. The method of claim 1, wherein the plurality of suspicious request packets is grouped into the plurality of subsets based on a similarity, such that all suspicious request packets belonging to a common subset of the plurality of subsets share a common attribute.

11. The method of claim 10, wherein the common attribute comprises at least one of: a hypertext transfer protocol attribute, a transfer control protocol attribute, or an internet protocol attribute.

12. The method of claim 11, wherein the hypertext transfer protocol attribute comprises at least one of: uri, method, host, accept, accept-encoding, user-agent, version, content length, content-type, content-encoding, connection, or referer.

13. The method of claim 11, wherein the transfer control protocol attribute or the internet protocol attribute comprises at least one of: src_addr, dst_addr, len, ttl, protocol, src_prt, destination port, or dst_prt.

14. The method of claim 1, wherein the grouping is performed using spectral clustering or affinity propagation.

15. The method of claim 1, wherein the representative packet comprises a suspicious request packet within the one subset that is closest to the centroid.

16. The method of claim 1, further comprising:
generalizing, by the processing system subsequent to the identifying the representative packet but prior to the generating the signature, information extracted from the representative packet to produce a generalized rule set.

17. The method of claim 16, wherein the signature is generated based on the generalized rule set.

18. The method of claim 1, wherein the signature is capable of being operated at a minimum rate of ten gigabytes per second.

19. A non-transitory computer-readable medium storing instructions which, when executed by a processing system including at least one processor, cause the processing system to perform operations, the operations comprising:
acquiring a plurality of hypertext transfer protocol session packets associated with a plurality of known trojans, wherein all trojans in the plurality of known trojans are identified by a common signature identifier;
extracting a plurality of request packets from the plurality of hypertext transfer protocol session packets;
identifying a plurality of suspicious request packets within the plurality of request packets that is extracted from the hypertext transfer protocol session packets;
grouping the plurality of suspicious request packets into a plurality of subsets;
computing a centroid of one subset of the plurality of subsets;
identifying a representative packet for the one subset, wherein the representative packet is identified based on the centroid; and
generating a signature for the one subset, based on the representative packet, wherein the signature is deployable by an intrusion detection system to detect an instance of a trojan of the plurality of known trojans.

20. A system comprising:
a processing system including at least one processor; and
a non-transitory computer-readable medium storing instructions which, when executed by the processing system, cause the processing system to perform operations, the operations comprising:
acquiring a plurality of hypertext transfer protocol session packets associated with a plurality of known trojans, wherein all trojans in the plurality of known trojans are identified by a common signature identifier;
extracting a plurality of request packets from the plurality of hypertext transfer protocol session packets;
identifying a plurality of suspicious request packets within the plurality of request packets that is extracted from the hypertext transfer protocol session packets;
grouping the plurality of suspicious request packets into a plurality of subsets;
computing a centroid of one subset of the plurality of subsets;
identifying a representative packet for the one subset, wherein the representative packet is identified based on the centroid; and
generating a signature for the one subset, based on the representative packet, wherein the signature is deployable by an intrusion detection system to detect an instance of a trojan of the plurality of known trojans.

\* \* \* \* \*